United States Patent [19]
Epstein et al.

[11] Patent Number: 5,594,191
[45] Date of Patent: Jan. 14, 1997

[54] SYSTEM FOR INSTRUCTING NOTE AND CHORD FINGER PLACEMENT ON STRINGED INSTRUMENTS

[76] Inventors: Gary Epstein, 15 Bonad Rd., West Roxbury, Mass. 01232; Nicholas C. Vecchio, 110 Dean St., #63, Taunton, Mass. 02780

[21] Appl. No.: 559,895

[22] Filed: Nov. 20, 1995

Related U.S. Application Data

[63] Continuation of Ser. No. 203,810, Mar. 1, 1994, abandoned.

[51] Int. Cl.⁶ .................................................. G09B 15/00
[52] U.S. Cl. ................................... 84/485 R; 84/453
[58] Field of Search ....................... 84/485 R, 485 SR, 84/471 R, 477 R, 479 A, 453

[56] References Cited

U.S. PATENT DOCUMENTS

| | | | |
|---|---|---|---|
| 3,153,970 | 10/1964 | Mulchi | 84/485 R |
| 3,572,205 | 7/1969 | Scholfield | 84/474 |
| 3,748,947 | 7/1973 | Frieheit | 84/485 SR |
| 4,175,468 | 11/1979 | Whitlock | 84/485 SR |
| 4,314,499 | 2/1982 | Olsen | 84/485 SR |
| 4,537,111 | 8/1985 | Heath | 84/485 R |
| 4,559,861 | 12/1985 | Patty et al. | 84/470 R |
| 4,712,464 | 12/1987 | Nance | 84/485 R |

*Primary Examiner*—Cassandra C. Spyrou
*Attorney, Agent, or Firm*—David S. Resnick; Dike, Bronstein, Roberts & Cushman

[57] ABSTRACT

Disclosed in a system for instructing note and chord finger placement on a stringed instrument having a plurality of strings and frets arranged along a fingerboard comprising at least one instruction element adapted to be positioned adjacent to the fingerboard of the stringed instrument and having thereon a first indicia corresponding to the frets and a second indicia corresponding to the strings and frets, said second indicia denoting notes capable of being sounded by the instrument when a string depression is made at a corresponding location on the fingerboard.

3 Claims, 1 Drawing Sheet

5,594,191

SYSTEM FOR INSTRUCTING NOTE AND CHORD FINGER PLACEMENT ON STRINGED INSTRUMENTS

This is a continuation of application Ser. No. 08/203,810 filed on Mar. 1, 1994 now abandoned.

FIELD OF THE INVENTION

The present invention relates to a system to aid in instructing note and chord finger placement on the fingerboard of conventional guitars or other stringed musical instruments (e.g., violins, violas, cellos, bass fiddle, banjos, ukeleles, and the like).

BACKGROUND OF THE INVENTION

Learning to play a musical instrument can be a difficult and challenging process. Almost all beginner guitar students find learning to play Barre chords, for example, physically difficult in that the strings dig into the joints and the softer parts of the first finger. After overcoming the physical difficulty, remembering the location of the chords and notes can be ever more challenging. Most students find this stage of instruction the most frustrating and as a result many students quit.

A number of devices have been developed to assist in teaching music. See, for example, U.S. Pat. Nos. 3,572,205; 3,748,947; 4,175,468; 4,537,111. However, most of these devices are complex in construction, difficult to utilize and understand, and much to expensive for the beginner music student. For example, U.S. Pat. No. 4,314,499 uses a guitar having a grid system of lights that illuminate when a certain note or chord is hit.

There exists, therefore, a significant need for a versatile system for instructing note and chord finger placement on a stringed instrument that can be easily utilized by beginner students. Additionally, an improved teaching system is needed that can be easily attached and removed from the instrument without causing damage. Moreover, such an improved music teaching system should allow beginner students to learn note and chord finger placement quickly so that they will continually improve and remain interested. The present invention fulfills these needs in a relatively inexpensive fashion, and provides further related advantages as described below.

SUMMARY OF THE INVENTION

The present invention relates to a novel system for instructing note and chord finger placement that can be attached to a stringed instrument and easily utilized by a music student.

The system of the present invention generally comprises at least one instruction element adapted to be positioned adjacent to a stringed instrument fingerboard having a plurality of strings and frets, under the strings. The instruction element has thereon a first indicia corresponding to the frets and a second indicia corresponding to the strings and frets. The second indicia denoting notes capable of being sounded by the instrument when a string depression is made at a corresponding location on the fingerboard.

In one embodiment, the instruction element is affixed on the stringed instrument adjacent the fingerboard. Preferably, the instruction element is reversibly affixed, thus permitting subsequent detachment and repositioning of the element. This feature allows the student to practice finger positions with the instruction element attached to the instrument. The element can then be easily removed, without causing damage to the instrument, thus allowing the student to test their memory. This process can be continued until the student has mastered the finger positions.

In accordance with a preferred embodiment of the present invention, the system utilizes an instruction element formed from a self-adherent plastic material. This material allows the element to be attached adjacent the fingerboard of the instrument via an electrostatic interaction between the plastic material and the instrument.

In accordance with another embodiment of the present invention, the system utilizes a plurality of instruction elements each being adapted to be overlaid. This system allows the advanced student to learn a number of chord and note finger positions simultaneously.

Other features and advantages will become apparent from the following more detailed description which when taken in conjunction with the accompanying drawings, which illustrate, by way of example, the principles of the invention.

BRIEF DESCRIPTION OF THE DRAWINGS

A more complete understanding of the invention may be provided by reference of the accompanying drawing wherein.

DETAILED DESCRIPTION OF THE INVENTION

Figure 1:
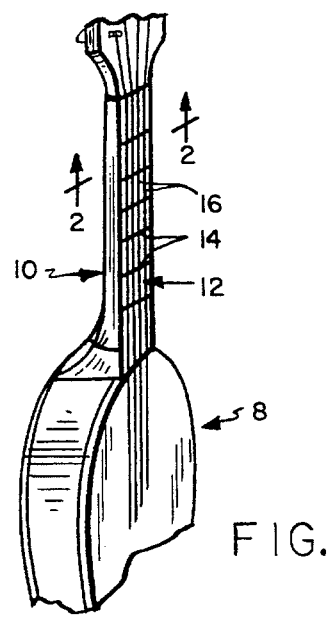
FIG. 1 is a perspective of the side view of one embodiment of the present invention affixed adjacent to the fingerboard of a conventional guitar.
Figure 3:
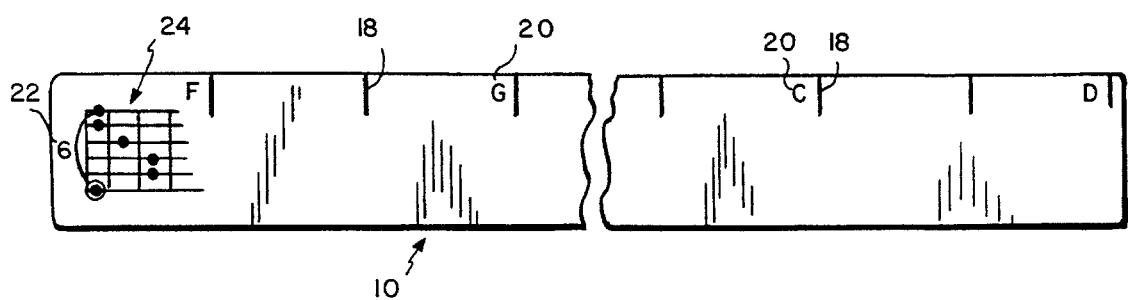
FIG. 3 is an elevational view of one embodiment of the present invention.

As shown in the drawings, the present invention provides a versatile system for instructing note and chord finger placement on a stringed instrument. As shown in FIG. 1, the system comprises at least one instruction element 10 adapted to be positioned adjacent to a stringed instrument fingerboard 12 having a plurality of frets 14 and strings 16. The instruction element has thereon indicia 18 corresponding to the frets and, as can be seen in FIG. 3, a second indicia 20 corresponding to the strings and frets. The second indicia denoting notes capable of being sounded by the instrument when a string depression is made at a corresponding location on the fingerboard.

FIG. 1 illustrates the use of the present invention on a conventional guitar 8. However, the present invention is easily adapted for use with other stringed instrument having a fingerboard including, for example, violins, violas, cellos, bass fiddle, banjos, ukeleles, and the like.

Figure 2:
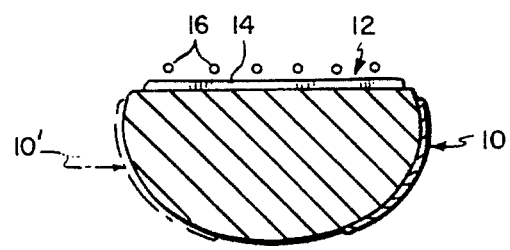
FIG. 2 is a cross-sectional view taken along line 2—2 of FIG. 1.

Instruction element 10 can be formed from any material capable of being position adjacent to the fingerboard of a stringed instrument. Such materials include, for example, paper, cardboard, vinyl or plastic. Preferably, the material is relatively thin and flexible to allow it to conform to the contours of the instrument neck as illustrated in FIG. 2.

The size of the instruction element depends on the stringed instrument that the system is to be used with and need only be of a size sufficient to allow the user to see the indicia.

As shown in FIG. 3, the instruction element 10 has indicia 18 corresponding to the frets. The indicia 18 allow the user to position the element, adjacent the fingerboard, such that the indicia and frets line-up, as shown in FIG. 1. The second indicia 20 correspond to the strings and frets, and denote a note or notes capable of being sounded by the instrument when a string depression is made at a corresponding location on the fingerboard.

The instruction element may also include other indicia that may be useful in instructing the student. Such other indicia include, for example, an indicia 22 designating which string the notes correspond to, i.e., on a conventional guitar the elements may be designated one through six. The element may also include a chord finger pattern 24 that illustrates the finger position for each chord.

A plurality of instruction elements each being adapted to the overlaid can be utilized in the system of the present invention. For example, the instruction element may be formed from a transparent material, thus allowing indicia of the instruction element affixed to the instrument to be viewed through subsequent overlaid elements. Each instruction element may contain different indicia. This system allows the advanced student to learn a number of finger positions simultaneously.

The instruction element can be affixed to the stringed instrument using any means available to the skilled artisan. The element may be permanently affixed, for example, using glue or tape. Alternatively, the element may be reversibly affixed using, for example, a reusable, non-permanent adhesive, or a matching hook and loop type fastener commonly sold under the trademark "VELCRO" brand hook and loop type fastener. Preferably, the element is reversibly affixed by forming the element from a self-adherent plastic that allows the element to be attached via electrostatic interaction between the plastic material and the instrument. Suitable materials include polyvinyl chloride sheets identified by the trademark "FLEXMARK" brand polyvinyl chloride sheets, a trademark of FLEXcon Company, Inc., Spencer Mass. As illustrated in FIG. 2, the element 10 can be affixed adjacent the fingerboard 12 on either side of the either side of the instrument neck 10', and thus can accommodate right and left handed players.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A system for instructing note and chord finger placement on a stringed instrument having a neck, said neck having a front side and back side, and a plurality of strings and frets arranged along a fingerboard on the front side of the neck comprising:

at least one self-adherent plastic instruction element having means for reversibly attaching via electrostatic interaction the instruction element to the back side of the neck adjacent to the fingerboard, said instruction element having thereon a first indicia corresponding to the frets and a second indicia corresponding to the strings and frets, said second indicia denoting notes capable of being sounded by the instrument when a string depression is made at a corresponding location on the fingerboard.

2. The system of claim 1, wherein the instruction element comprises polyvinyl chloride.

3. The system of claim 2, wherein the instruction element is transparent.

* * * * *